(12) United States Patent
Zhang et al.

(10) Patent No.: US 10,891,517 B2
(45) Date of Patent: *Jan. 12, 2021

(54) VEHICLE ACCIDENT IMAGE PROCESSING METHOD AND APPARATUS

(71) Applicant: Advanced New Technologies Co., Ltd., George Town (KY)

(72) Inventors: Haitao Zhang, Hangzhou (CN); Yongchao Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,919

(22) Filed: Dec. 20, 2019

(65) Prior Publication Data

US 2020/0125895 A1 Apr. 23, 2020

Related U.S. Application Data

(63) Continuation of application No. 16/274,930, filed on Feb. 13, 2019.

(30) Foreign Application Priority Data

Feb. 13, 2018 (CN) .......................... 2018 1 0148839

(51) Int. Cl.
*G06K 9/62* (2006.01)
*G06N 3/08* (2006.01)
(Continued)

(52) U.S. Cl.
CPC ....... *G06K 9/6256* (2013.01); *G06K 9/00624* (2013.01); *G06K 9/4628* (2013.01);
(Continued)

(58) Field of Classification Search
None
See application file for complete search history.

(56) References Cited

U.S. PATENT DOCUMENTS 10,373,027 B1 * 8/2019 Kim .......................... G06N 3/04
10,510,142 B1 * 12/2019 Dohner .................. G06Q 50/10
(Continued)

FOREIGN PATENT DOCUMENTS

CN 105184778 12/2015
CN 105424330 3/2016
(Continued)

OTHER PUBLICATIONS

International Preliminary Report on Patentability in International Application No. PCT/US2019/017828, dated May 18, 2020, 12 pages.

(Continued)

*Primary Examiner* — Gandhi Thirugnanam
(74) *Attorney, Agent, or Firm* — Fish & Richardson P.C.

(57) ABSTRACT

N vehicle accident images are obtained, where N is a natural number greater than or equal to 2. N feature vectors are obtained by inputting the vehicle accident images into a trained convolutional neural network, where the N feature vectors respectively correspond to the vehicle accident images. A distance is calculated between any two feature vectors of the N feature vectors. A determination is made that two vehicle accident images of the N vehicle accident images corresponding to the distance are abnormal when the distance is greater than a first predetermined threshold.

15 Claims, 11 Drawing Sheets

(51) Int. Cl.
  *G06K 9/00* (2006.01)
  *G06N 3/04* (2006.01)
  *G06K 9/46* (2006.01)
  *G06N 7/00* (2006.01)
  *G06T 7/00* (2017.01)

(52) U.S. Cl.
  CPC ......... *G06K 9/6215* (2013.01); *G06K 9/6271* (2013.01); *G06N 3/0454* (2013.01); *G06N 3/08* (2013.01); *G06N 7/005* (2013.01); *G06T 7/0002* (2013.01); *G06T 2207/20081* (2013.01); *G06T 2207/20084* (2013.01); *G06T 2207/30252* (2013.01)

(56) References Cited

U.S. PATENT DOCUMENTS

| | | | | |
|---|---|---|---|---|
| 10,699,192 | B1* | 6/2020 | Kim | G06K 9/6277 |
| 2015/0278642 | A1 | 10/2015 | Chertok et al. | |
| 2015/0306761 | A1 | 10/2015 | O'Connor et al. | |
| 2016/0104053 | A1 | 4/2016 | Yin et al. | |
| 2016/0321784 | A1 | 11/2016 | Annapureddy | |
| 2017/0357896 | A1 | 12/2017 | Tsatsin et al. | |
| 2018/0293552 | A1* | 10/2018 | Zhang | G06N 3/0454 |
| 2018/0293664 | A1* | 10/2018 | Zhang | G06K 9/3233 |
| 2019/0026603 | A1* | 1/2019 | Li | G06K 9/4652 |
| 2019/0213689 | A1* | 7/2019 | Zhang | G06K 9/3233 |
| 2019/0251395 | A1* | 8/2019 | Zhang | G06K 9/6271 |
| 2020/0160113 | A1* | 5/2020 | Zhang | G06K 9/6215 |

FOREIGN PATENT DOCUMENTS

| | | |
|---|---|---|
| CN | 106022220 | 10/2016 |
| CN | 106469299 | 3/2017 |
| CN | 108399382 | 8/2018 |
| TW | 200304095 | 9/2003 |
| TW | I607387 | 12/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.
International Search Report and Written Opinion in International Application No. PCT/US2019/017828, dated Apr. 4, 2019, 17 pages.
Nakamoto, "Bitcoin: A Peer-to-Peer Electronic Cash System," www.bitcoin.org, 2005, 9 pages.
PCT Written Opinion of the International Preliminary Examining Authority in International Application No. PCT/US2019/017828, dated Jan. 21, 2020, 7 pages.
Shen et al., "Learning deep neural networks for vehicle re-ID with visual-spatio-temporal path proposals," Department of Electronic Engineering, the Chinese University of Hong Kong, 2017, 10 pages.
Zhang et al., "Improving triplet-wise training of convolutional neural network for vehicle re-identification," 2017 IEEE International Conference on Multimedia and Expo (ICME), 2017, 1386-1391.

* cited by examiner

Obtain at least one negative sample pair, where each negative sample pair includes a third image and a fourth image, and the third image and the fourth image correspond to different vehicle accident scenes ⟋41

Train a convolutional neural network by using the at least one negative sample pair, to increase the sum of at least one second distance respectively corresponding to the negative sample pair ⟋42

FIG. 4

VEHICLE ACCIDENT IMAGE PROCESSING METHOD AND APPARATUS

CROSS-REFERENCE TO RELATED APPLICATIONS

This application claims priority to U.S. application Ser. No. 16/274,930, filed on Feb. 13, 2019, which claims priority to Chinese Patent Application No. 201810148839.8, filed on Feb. 13, 2018, which are hereby incorporated by reference in their entirety.

TECHNICAL FIELD

The present invention relates to the field of image processing, and specifically, to a method and an apparatus for training a convolutional neural network for processing a vehicle accident image, and a vehicle accident image processing method and apparatus.

BACKGROUND

As cars gradually become commonly used travel tools, the vehicle insurance market also rapidly develops, and vehicle insurance services are growing fast too. It is a very important step to fast and accurately assess a vehicle accident loss in the vehicle insurance service. For assessing the vehicle accident loss, a group of photos taken at a vehicle accident scene are needed. The group of photos can be taken by the insurance inspector at the scene, or can be independently taken by the insured and sent to the insurance inspector. In some cases, photos that are taken at a scene other than the vehicle accident scene can be mixed in the vehicle accident photos on purpose, and the photos can be of a similar vehicle but not the exact vehicle, are taken at a different place, or are taken at a later time. Some photographing devices store metadata information such as the photographing time, the photographing device, and the photographing location in photos, and the metadata information can be used to determine whether the photos are taken at the same vehicle accident scene. However, not all photos include metadata such as the time and the location, and such metadata is very easy to modify. In addition, Manual photo examination is labor-consuming, and examination quality cannot be ensured. Therefore, a more effective vehicle accident photo processing solution is needed.

SUMMARY

Implementations of the present specification are intended to provide a more effective vehicle accident photo processing solution, to reduce disadvantages in the existing technology.

To achieve the objective, an aspect of the present specification provides a method for training a convolutional neural network for processing a vehicle accident image, including the following: obtaining at least one positive sample pair, where each positive sample pair includes a first image and a second image, and the first image and the second image correspond to the same vehicle accident scene; and training the convolutional neural network by using the at least one positive sample pair, to decrease the sum of at least one first distance respectively corresponding to the positive sample pair, where the first distance is a distance between a feature vector of the first image that is obtained by using the convolutional neural network and a feature vector of the second image that is obtained by using the convolutional neural network.

Another aspect of the present specification provides a method for training a convolutional neural network for processing a vehicle accident image, including the following: obtaining at least one negative sample pair, where each negative sample pair includes a third image and a fourth image, and the third image and the fourth image correspond to different vehicle accident scenes; and training the convolutional neural network by using the at least one negative sample pair, to increase the sum of at least one second distance respectively corresponding to the negative sample pair, where the second distance is a distance between a feature vector of the third image that is obtained by using the convolutional neural network and a feature vector of the fourth image that is obtained by using the convolutional neural network.

Another aspect of the present specification provides a method for training a convolutional neural network for processing a vehicle accident image, including the following: obtaining at least one positive sample pair and at least one negative sample pair, where each positive sample pair includes a first image and a second image, the first image and the second image correspond to the same vehicle accident scene, each negative sample pair includes a third image and a fourth image, and the third image and the fourth image correspond to different vehicle accident scenes; and training the convolutional neural network by using the at least one positive sample pair and the at least one negative sample pair, to decrease a value obtained by subtracting the sum of at least one second distance corresponding to the negative sample pair from the sum of at least one first distance corresponding to the positive sample pair, where the first distance is a distance between a feature vector of the first image that is obtained by using the convolutional neural network and a feature vector of the second image that is obtained by using the convolutional neural network, and the second distance is a distance between a feature vector of the third image that is obtained by using the convolutional neural network and a feature vector of the fourth image that is obtained by using the convolutional neural network.

In an implementation, in the method for training a convolutional neural network, the distance is a Euclidean distance.

Another aspect of the present specification provides an apparatus for training a convolutional neural network for processing a vehicle accident image, including the following: an acquisition unit, configured to obtain at least one positive sample pair, where each positive sample pair includes a first image and a second image, and the first image and the second image correspond to the same vehicle accident scene; and a training unit, configured to train the convolutional neural network by using the at least one positive sample pair, to decrease the sum of at least one first distance respectively corresponding to the positive sample pair, where the first distance is a distance between a feature vector of the first image that is obtained by using the convolutional neural network and a feature vector of the second image that is obtained by using the convolutional neural network.

Another aspect of the present specification provides an apparatus for training a convolutional neural network for processing a vehicle accident image, including the following: an acquisition unit, configured to obtain at least one negative sample pair, where each negative sample pair includes a third image and a fourth image, and the third image and the fourth image correspond to different vehicle accident scenes; and a training unit, configured to train the convolutional neural network by using the at least one negative sample pair, to increase the sum of at least one second distance respectively corresponding to the negative sample pair, where the second distance is a distance between a feature vector of the third image that is obtained by using the convolutional neural network and a feature vector of the fourth image that is obtained by using the convolutional neural network.

Another aspect of the present specification provides an apparatus for training a convolutional neural network for processing a vehicle accident image, including the following: an acquisition unit, configured to obtain at least one positive sample pair and at least one negative sample pair, where each positive sample pair includes a first image and a second image, the first image and the second image correspond to the same vehicle accident scene, each negative sample pair includes a third image and a fourth image, and the third image and the fourth image correspond to different vehicle accident scenes; and a training unit, configured to train the convolutional neural network by using the at least one positive sample pair and the at least one negative sample pair, to decrease a value obtained by subtracting the sum of at least one second distance corresponding to the negative sample pair from the sum of at least one first distance corresponding to the positive sample pair, where the first distance is a distance between a feature vector of the first image that is obtained by using the convolutional neural network and a feature vector of the second image that is obtained by using the convolutional neural network, and the second distance is a distance between a feature vector of the third image that is obtained by using the convolutional neural network and a feature vector of the fourth image that is obtained by using the convolutional neural network.

Another aspect of the present specification provides a vehicle accident image processing method, including the following: obtaining N vehicle accident images, where N is a natural number greater than or equal to 2; obtaining N feature vectors respectively corresponding to the vehicle accident images by inputting the vehicle accident images to a convolutional neural network obtained by using the previous training method; calculating a distance between any two of the feature vectors; and determining that two vehicle accident images corresponding to the distance are abnormal when the distance is greater than a first predetermined threshold.

In an implementation, the vehicle accident image processing method further includes the following: determining the number B of distances greater than the first predetermined threshold after determining that the two vehicle accident images corresponding to the distance are abnormal; calculating a first probability $P1=B/N$; and determining that the N vehicle accident images are generally abnormal when the first probability is greater than a second predetermined threshold.

In an implementation, the vehicle accident image processing method further includes the following: determining the number M of abnormal vehicle accident images in the N vehicle accident images after determining that the two vehicle accident images corresponding to the distance are abnormal; calculating a second probability $P2=M/N$; and determining that the N vehicle accident images are generally abnormal when the second probability is greater than a third predetermined threshold.

Another aspect of the present specification provides a vehicle accident image processing apparatus, including the following: an acquisition unit, configured to obtain N vehicle accident images, where N is a natural number greater than or equal to 2; a feature acquisition unit, configured to input the vehicle accident images to a convolutional neural network obtained by using the previous training method, to obtain N feature vectors respectively corresponding to the vehicle accident images; a first calculation unit, configured to calculate a distance between any two of the feature vectors; and a first determining unit, configured to determine that two vehicle accident images corresponding to the distance are abnormal when the distance is greater than a first predetermined threshold.

In an implementation, the vehicle accident image processing apparatus further includes the following: a second determining unit, configured to determine the number B of distances greater than the first predetermined threshold after it is determined that the two vehicle accident images corresponding to the distance are abnormal; a second calculation unit, configured to calculate a first probability $P1=B/N$; and a third determining unit, configured to determine that the N vehicle accident images are generally abnormal when the first probability is greater than a second predetermined threshold.

In an implementation, the vehicle accident image processing apparatus further includes the following: a fourth determining unit, configured to determine the number M of abnormal vehicle accident images in the N vehicle accident images after it is determined that the two vehicle accident images corresponding to the distance are abnormal; a third calculation unit, configured to calculate a second probability $P2=M/N$; and a fifth determining unit, configured to determine that the N vehicle accident images are generally abnormal when the second probability is greater than a third predetermined threshold.

Another aspect of the present specification provides a computer readable storage medium. The computer readable storage medium stores instruction code, and when the instruction code is executed in a computer, the computer performs the method for training a convolutional neural network and/or the vehicle accident image processing method.

Another aspect of the present specification provides a computing device including a memory and a processor. The memory stores executable code, and when executing the executable code, the processor implements the method for training a convolutional neural network and/or the vehicle accident image processing method.

Based on the method and apparatus for training a convolutional neural network for processing a vehicle accident image, and the vehicle accident image processing method and apparatus according to the implementations of the present specification, vehicle accident images can be quickly processed with high-accuracy and a high recall rate. As such, the vehicle accident images are fast and automatically processed.

BRIEF DESCRIPTION OF DRAWINGS

The implementations of the present specification can be described more clearly with reference to the accompanying drawings.

FIG. 4 illustrates a method for training a convolutional neural network, according to an implementation of the present specification;

DESCRIPTION OF IMPLEMENTATIONS

The implementations of the present specification are described below with reference to the accompanying drawings.

Figure 1:
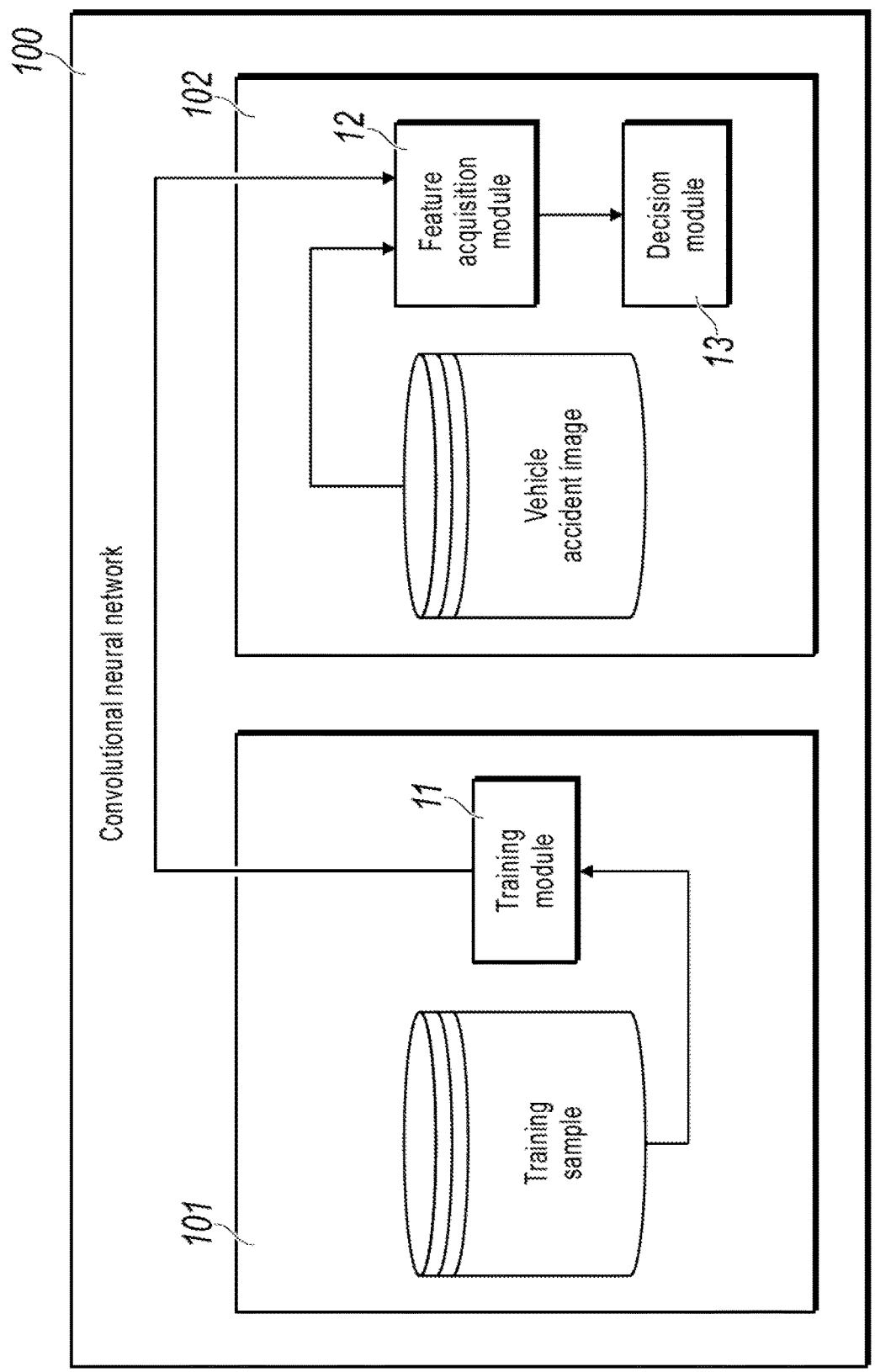
FIG. 1 is a schematic diagram illustrating a system, according to an implementation of the present specification.

FIG. 1 is a schematic diagram illustrating a system 100, according to an implementation of the present specification. The system 100 includes a training part 101 and a processing part 102. The training part 101 includes a training module 11. The training module 11 can use a Siamese network, a Triplet network, etc. The training module 11 includes a convolutional neural network, and is configured to train the convolutional neural network. The convolutional neural network includes a convolutional layer, an activation layer, a normalization layer, a pooling layer, etc., and can use a commonly used network structure such as ResNet or Inception. The convolutional neural network is trained by inputting a large number of vehicle accident images (corresponding to a positive sample pair and a negative sample pair in the Siamese network and corresponding to a triplet sample in the Triplet network) to the training module 11, to train and obtain a convolutional neural network that can be used for processing the vehicle accident images.

In this implementation of the present specification, an image can be a generic term of various graphics and images, usually an image with a visual effect, and can usually include a picture on a piece of paper, a picture on a negative or a photo, a picture on a television, a picture on a projector or a computer screen, etc. The vehicle accident image in this implementation can include computer image data that is stored on a readable storage medium after being obtained by using a camera or photographing device, and can include various types of computer images such as a vector diagram, a bitmap, and a static or dynamic image.

The processing part 102 includes a feature acquisition module 12 and a decision module 13. The feature acquisition module 12 includes the convolutional neural network obtained through training by the training module 11. A group of vehicle accident images are input to the feature acquisition module 12. Then the feature acquisition module 12 can separately obtain a plurality of feature vectors corresponding to the group of vehicle accident images from the group of vehicle accident images, and send the plurality of feature vectors to the decision module 13. The decision module 13 calculates the plurality of feature vectors based on a decision algorithm of the decision module 13 to obtain a decision result, to determine whether the group of vehicle accident images are abnormal.

A method according to an implementation of the present specification is described below in detail with reference to an example.

Figure 2:
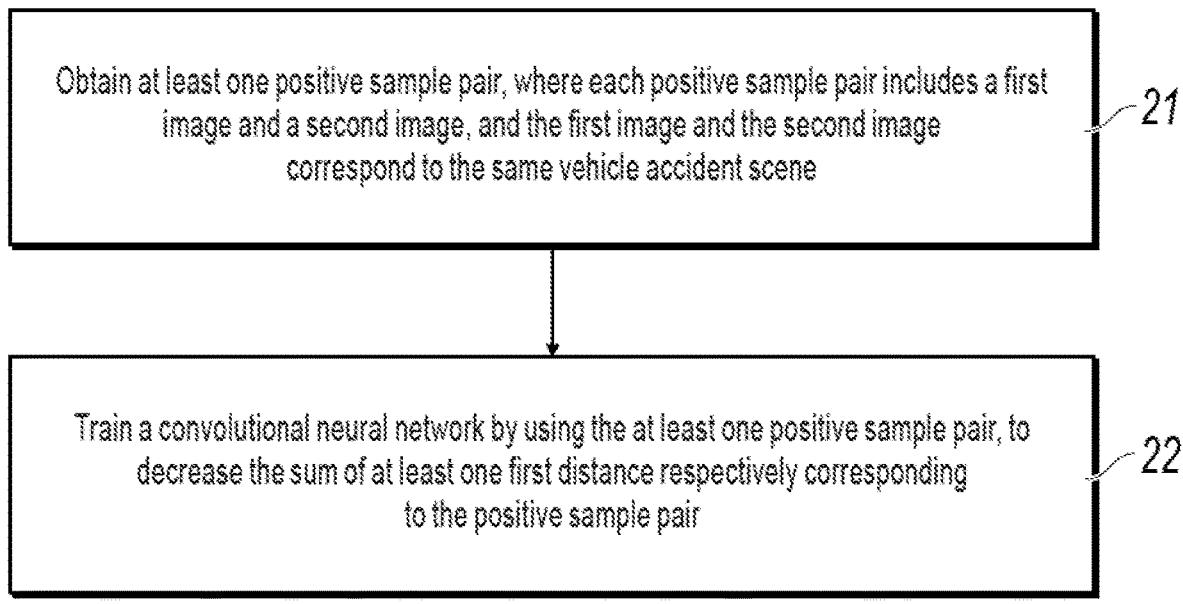
FIG. 2 illustrates a method for training a convolutional neural network, according to an implementation of the present specification.

FIG. 2 illustrates a method for training convolutional neural network M, according to an implementation of the present specification. Convolutional neural network M is used for processing a vehicle accident image. As shown in FIG. 2, the method includes the following steps: Step S21: Obtain at least one positive sample pair, where each positive sample pair includes a first image and a second image, and the first image and the second image correspond to the same vehicle accident scene. Step S22: Train the convolutional neural network by using the at least one positive sample pair, to decrease the sum of at least one first distance respectively corresponding to the positive sample pair, where the first distance is a distance between a feature vector of the first image that is obtained by using the convolutional neural network and a feature vector of the second image that is obtained by using the convolutional neural network.

First, in step S21, the at least one positive sample pair is obtained. Each positive sample pair includes the first image and the second image, and the first image and the second image correspond to the same vehicle accident scene. In an implementation, the training module 11 in FIG. 1 trains convolutional neural network M by using a Siamese network. A pair of images, namely, a positive sample pair or a negative sample pair, need to be input in the Siamese network. Any two images corresponding to the same real vehicle accident scene can form positive sample pair <I, I$^+$>. Two images respectively corresponding to two different scenes (for example, different vehicles, different locations, or different times) can form negative sample pair <I, I$^-$>.

A positive sample pair can be obtained by obtaining any two images, namely, the first image and the second image, corresponding to one real vehicle accident scene. A group of vehicle accident photos corresponding to the real vehicle accident scene can be taken by the insurance inspector at the vehicle accident scene. Alternatively, a group of vehicle accident photos corresponding to the real vehicle accident scene can be independently taken and uploaded by the insured. Alternatively, a plurality of groups of photos of the real vehicle accident scene can be obtained from a third party. Manual verification can be performed on these photos of the vehicle accident scene, to ensure that these groups of photos correspond to the same vehicle accident scene.

In step S22, the convolutional neural network is trained by using the at least one positive sample pair, to decrease the sum of the at least one first distance respectively corresponding to the positive sample pair. The first distance is the distance between the feature vector of the first image that is obtained by using the convolutional neural network and the feature vector of the second image that is obtained by using the convolutional neural network.

The convolutional neural network is a feed-forward neural network. An artificial neuron of the network can respond to some surrounding units within the coverage, and plays a prominent role in processing a large-scale image. The convolutional neural network includes a convolutional layer, a pooling layer, etc., and can use a commonly used network structure such as ResNet or Inception. When image I is input to convoluntional neural network M, convolutional neural network M outputs feature vector M(I) of the image. The feature vector M(I) corresponds to a depth feature of image I.

Figure 3:
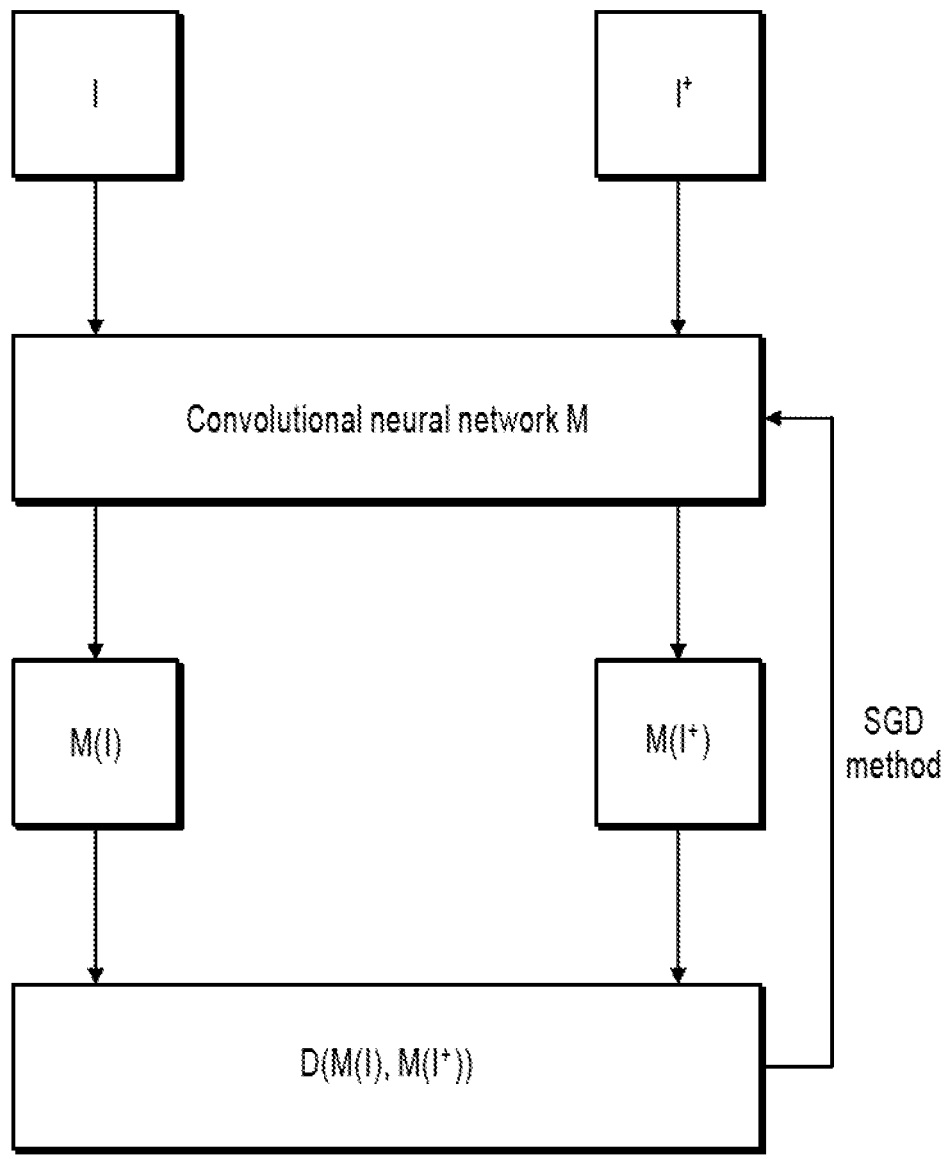
FIG. 3 schematically illustrates a process of training a convolutional neural network by using a positive sample pair.

FIG. 3 schematically illustrates a process of training the convolutional neural network by using the positive sample pair. First, by inputting positive sample pair <I, I$^+$> to convolutional neural network M, feature vector M(I) corresponding to I and feature vector M(I$^+$) corresponding to I$^+$ that include an existing parameter of M are obtained. Then, distance function D(M(I), M(I$^+$)) is defined. For example, distance D(M(I), M(I$^+$)) is a Euclidean distance between feature vector M(I) and feature vector M(I$^+$). In an implementation, distance D can alternatively be a Minkowski distance, a Manhattan distance, etc. The convolutional neural network is trained for decreasing D(M(I), M(I$^+$)) (namely, the previously described first distance).

In this implementation, the convolutional neural network is trained by using a stochastic gradient descent (SGD) method. However, in this implementation of the present specification, the convolutional neural network is not limited to being trained by using the SGD method. For example, the convolutional neural network can be trained by using an optimization algorithm known in the existing technology such as a batch gradient descent (BGD) method, a minibatch gradient descent (MBGD) method, an adaptive moment estimation (Adam) method, or an RMSProp method. As shown in FIG. 3, after D(M(I), M(I$^+$)) is obtained, a derivative of each parameter of D(M(I), M(I$^+$)) is taken, and each parameter of D(M(I), M(I$^+$)) is moved by a tiny step in a negative direction of the derivative of each parameter. As such, a value of D(M(I), M(I$^+$)) is decreased.

In an implementation, N (for example, 60) positive sample pairs are simultaneously input to convolutional neural network M to train network M. For example, M is trained by using the SGD method, to decrease a value of $D_1 + D_2 + \ldots + D_N$, where $D_i = D(M(I_i), M(I_i^+))$, and i ranges from 1 to N.

FIG. 4 illustrates a method for training a convolutional neural network, according to an implementation of the present specification. The convolutional neural network is used for processing a vehicle accident image. The method includes the following steps: Step S41: Obtain at least one negative sample pair, where each negative sample pair includes a third image and a fourth image, and the third image and the fourth image correspond to different vehicle accident scenes. Step S42: Train the convolutional neural network by using the at least one negative sample pair, to increase the sum of at least one second distance respectively corresponding to the negative sample pair, where the second distance is a distance between a feature vector of the third image that is obtained by using the convolutional neural network and a feature vector of the fourth image that is obtained by using the convolutional neural network.

First, in step S41, the at least one negative sample pair is obtained. Each negative sample pair includes the third image and the fourth image, and the third image and the fourth image correspond to the different vehicle accident scenes.

As previously described, two images respectively corresponding to two different scenes (for example, different vehicles, different locations, or different times) can form negative sample pair <I, I$^-$>. A plurality of negative sample pairs can be obtained by performing manual matching on vehicle accident photos of different scenes. To improve accuracy of training convolutional neural network M, a photo relatively similar to an existing vehicle accident photo is manually taken at another scene, and is matched with the existing vehicle accident photo to form a negative sample pair. For example, for a specific vehicle accident photo, a corresponding matching photo of a vehicle with the same model can be taken at a different time and at the same location to form a negative sample pair together with the specific photo. In addition to manually obtaining a negative sample pair, a negative sample pair can be generated by using generative adversarial networks (GANs). In an implementation, a plurality of negative sample pairs can be directly obtained from a third party.

In step S42, the convolutional neural network is trained by using the at least one negative sample pair, to increase the sum of the at least one second distance respectively corresponding to the negative sample pair, where the second distance is the distance between the feature vector of the third image that is obtained by using the convolutional neural network and the feature vector of the fourth image that is obtained by using the convolutional neural network.

Figure 5:
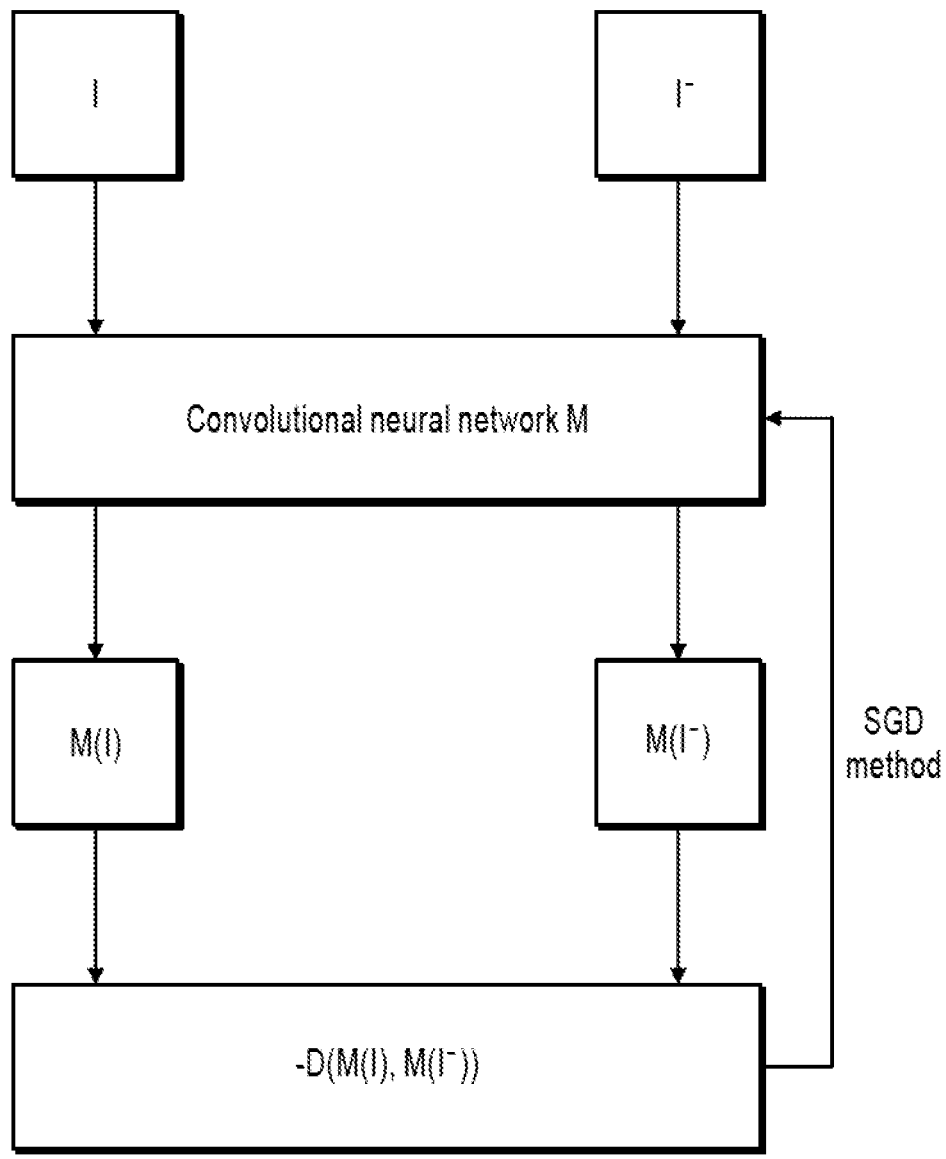
FIG. 5 schematically illustrates a process of training a convolutional neural network by using a negative sample pair.

FIG. 5 schematically illustrates a process of training the convolutional neural network by using the negative sample pair. The process is basically the same as the process shown in FIG. 3. By inputting negative sample pair <I, I$^-$> to convolutional neural network M, feature vector M(I) corresponding to I and feature vector M(I$^-$) corresponding to I$^-$ that include an existing parameter of M are obtained. However, in FIG. 4, a value of $-D(M(I), M(I^-))$ is decreased by using the SGD method. In other words, a value of $D(M(I), M(I^-))$ is increased, that is, a distance between the feature vectors corresponding to two images in the negative sample pair is increased. A training process that uses the SGD method in FIG. 5 is the same as that in FIG. 3. Details are omitted here for simplicity.

In an implementation, N (for example, 60) negative sample pairs are simultaneously input to convolutional neural network M to train network M. For example, M is trained by using the SGD method, to decrease a value of $-(D_1^- + D_2^- + \ldots + D_N^-)$, where $D_i^- = D(M(I_i), M(I_i^-))$, and i ranges from 1 to N.

In an implementation, convolutional neural network M is repeatedly trained by using a plurality of positive sample pairs and a plurality of negative sample pairs with reference to the methods shown in FIG. 3 and FIG. 5, to obtain convolutional neural network M with relatively high accuracy. For example, there can be tens of thousands of positive sample pairs and negative sample pairs.

In an implementation, network M is repeatedly trained by using a plurality of batches of positive sample pairs (for example, each batch of data includes 60 positive sample pairs). M is trained by simultaneously inputting each batch of positive sample pairs (for example, 60 pairs). In an implementation, network M is repeatedly trained by using a plurality of batches of negative sample pairs (for example, each batch of data includes 60 negative sample pairs). M is trained by simultaneously inputting each batch of negative sample pairs (for example, 60 pairs). As such, network M with relatively high accuracy is obtained. For example, there can be thousands of batches of pairs used for the training.

Figure 6:
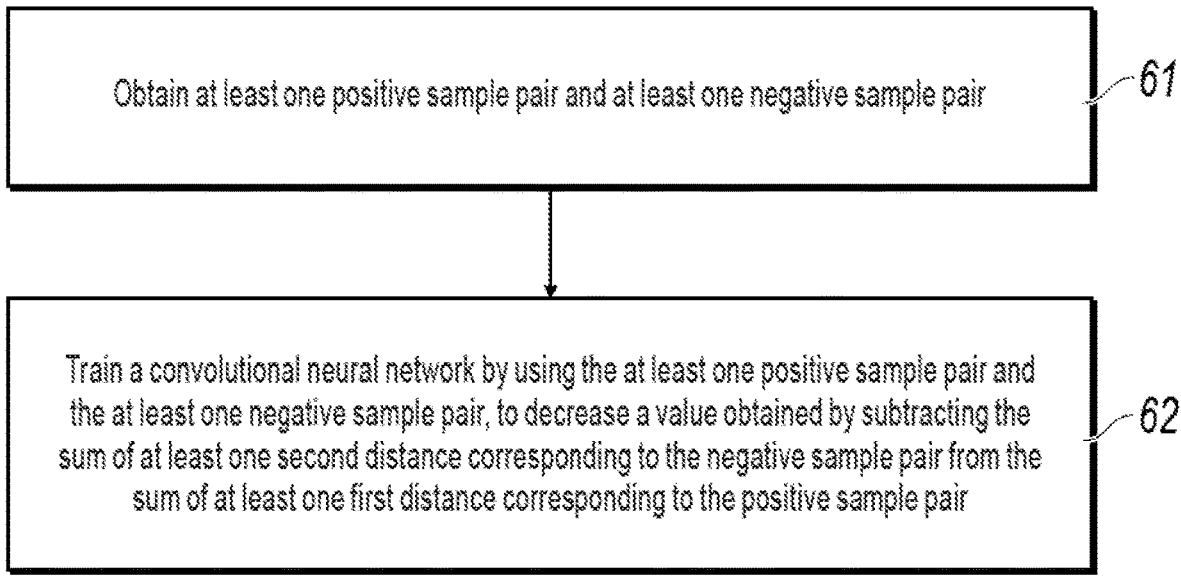
FIG. 6 illustrates a method for training a convolutional neural network, according to an implementation of the present specification.

FIG. 6 illustrates a method for training a convolutional neural network, according to an implementation of the present specification. The convolutional neural network is used for processing a vehicle accident image. As shown in FIG. 6, in step S61, at least one positive sample pair and at least one negative sample pair are obtained. In other words, at least one positive sample pair <I, I$^+$> and at least one negative sample pair <I, I$^-$> are obtained. Each positive sample pair includes a first image and a second image, and the first image and the second image correspond to the same vehicle accident scene. Each negative sample pair includes a third image and a fourth image, and the third image and the fourth image correspond to different vehicle accident scenes.

In step S62, the convolutional neural network is trained by using the at least one positive sample pair and the at least one negative sample pair, to decrease a value obtained by subtracting the sum of a plurality of second distances corresponding to the negative sample pair from the sum of a plurality of first distances corresponding to the positive sample pair. The first distance is a distance between a feature vector of the first image that is obtained by using the convolutional neural network and a feature vector of the second image that is obtained by using the convolutional neural network. The second distance is a distance between a feature vector of the third image that is obtained by using the convolutional neural network and a feature vector of the fourth image that is obtained by using the convolutional neural network. In other words, the convolutional neural network is trained by using the at least one positive sample pair and the at least one negative sample pair, to decrease a value of $(D_1+D_2+\ldots,+D_N)-(D_1^-+D_2^-+\ldots,+D_M^-)$, where $D_i=D(M(I_i), M(I_i^+))$, $D_j^-=D(M(I_j), M(I_j^-))$, i ranges from 1 to N, j ranges from 1 to M, N≥1, and M≥1.

In an implementation, there are a plurality of batches of sample pairs (each batch of sample pairs includes a positive sample pair and a negative sample pair), and network M is repeatedly trained by simultaneously inputting at least one positive sample pair and at least one negative sample pair, to obtain network M with relatively high accuracy. For example, there can be thousands of batches of pairs used for the training, and each batch of sample pairs can include tens of sample pairs.

Figure 7:
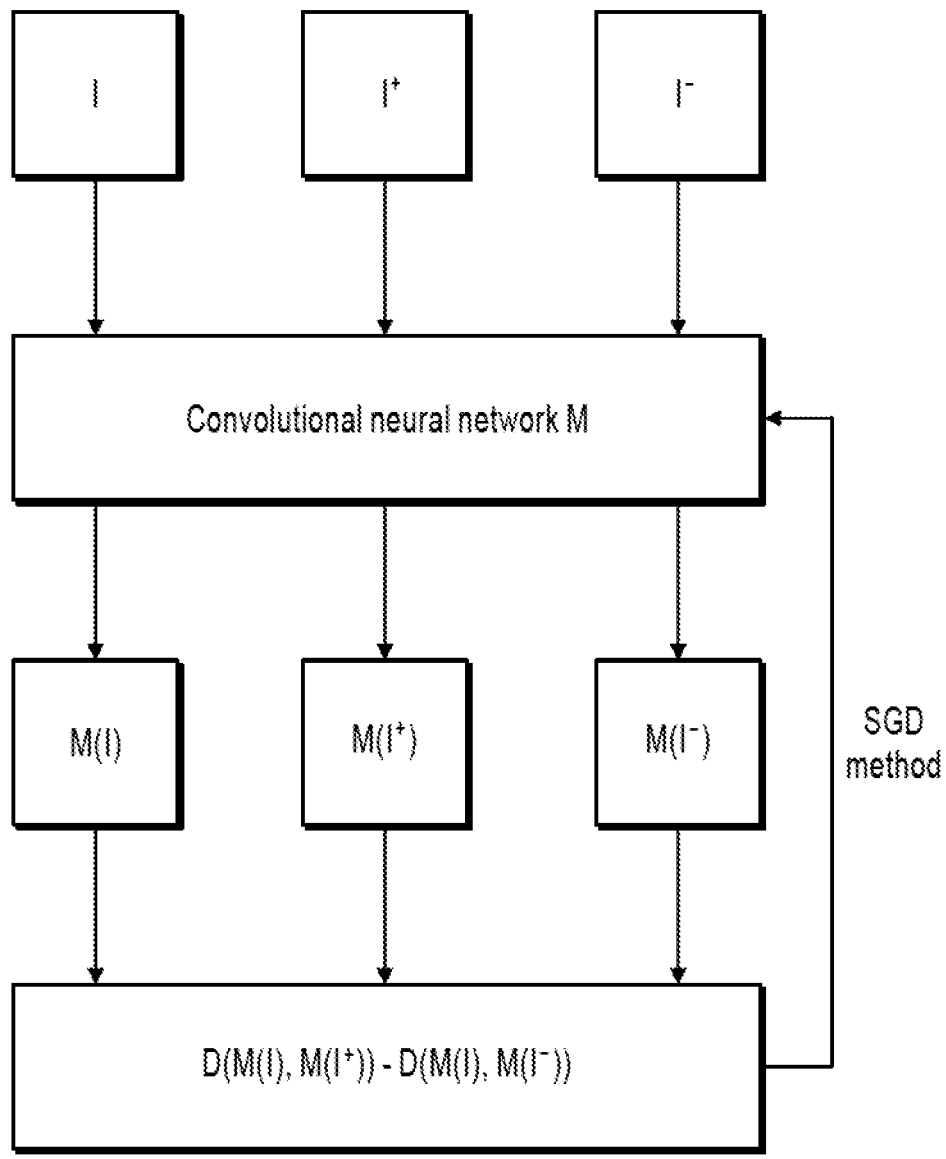
FIG. 7 schematically illustrates a process of training a convolutional neural network by using a triplet sample.

In an implementation, the second image and the third image can be the same. In an implementation, the training module 11 in FIG. 1 trains convolutional neural network M by using a Triplet network. Triplet sample <I, I$^+$, I$^-$> needs to be input in the Triplet network. Triplet sample <I, I$^+$, I$^-$> includes two images I and I$^+$ corresponding to the same vehicle accident scene and image I$^-$ corresponding to another vehicle accident scene different from the vehicle accident scene. The triplet sample can be used as an exception of the at least one positive sample pair and the at least one negative sample pair. In other words, I$^+$ and I in the triplet sample respectively correspond to the first image and the second image, and I and I$^-$ respectively correspond to the third image and the fourth image. FIG. 7 schematically illustrates a process of training a convolutional neural network by using a triplet sample. First, by inputting triplet sample <I, I$^+$, I$^-$> to convolutional neural network M, feature vector M(I) corresponding to I, feature vector M(I$^+$) corresponding to I$^+$, and feature vector M(I$^-$) corresponding to I$^-$ that include an existing parameter of M are obtained. Then, similar to FIG. 3 and FIG. 4, convolutional neural network M is trained by using, for example, the SGD method, to decrease the value of $D(M(I), M(I^+))-D(M=(I), M(I^-))$.

In an implementation, N (for example, 60) triplet samples are simultaneously input to convolutional neural network M to train the network. For example, M is trained by using the SGD method, to decrease a value of $(D_1+D_2+\ldots,+D_N)-(D_1^-+D_2^-+\ldots,+D_N^-)$, where $D_i=D(M(I_i), M(I_i^+))$, $D_i^-=D(M(I_i), M(I_i^-))$, and i ranges from 1 to N.

In an implementation, as shown in FIG. 7, convolutional neural network M is repeatedly trained by using a plurality of triplet samples to obtain convolutional neural network M with relatively high accuracy. For example, there can be tens of thousands of triplet samples.

In an implementation, there are a plurality of batches of triplet samples (for example, each batch of data includes 60 triplet samples), and network M is repeatedly trained by simultaneously inputting a batch of triplet samples (for example, 60 samples), to obtain network M with relatively high accuracy. For example, there can be thousands of batches of samples used for the training.

In an implementation, the training module 11 in FIG. 1 includes two training networks: a Siamese network and a Triplet network, to jointly train convolutional neural network M by using a plurality of positive sample pairs, negative sample pairs, and triplet samples, thereby improving accuracy of M.

Convolutional neural network M is trained by using the method according to the implementations of the present specification, so that feature vectors corresponding to input vehicle accident images can be accurately calculated from the vehicle accident images in obtained network M. As such, accuracy and a recall rate of subsequently processing the vehicle accident images are improved.

Figure 8:
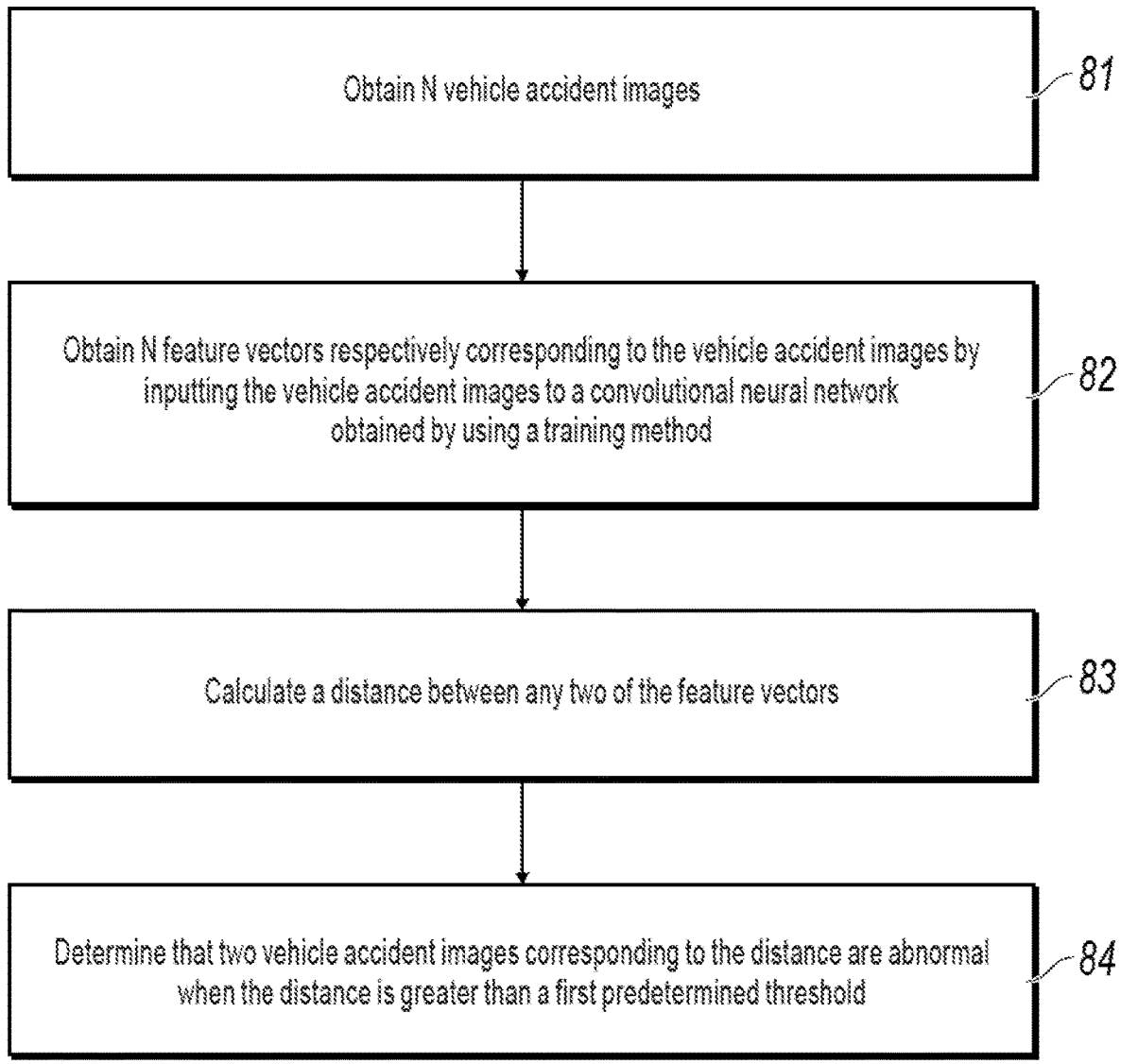
FIG. 8 illustrates a vehicle accident image processing method, according to an implementation of the present specification.

FIG. 8 illustrates a vehicle accident image processing method, according to an implementation of the present specification. The method includes the following steps: Step S81: Obtain N vehicle accident images, where N is a natural number greater than or equal to 2. Step S82: Obtain N feature vectors respectively corresponding to the vehicle accident images by inputting the vehicle accident images to a convolutional neural network obtained by using the previous training method. Step S83: Calculate a distance between any two of the feature vectors. Step S84: Determine that two vehicle accident images corresponding to the distance are abnormal when the distance is greater than a first predetermined threshold.

First, in step S81, the N vehicle accident images are obtained, where N is a natural number greater than or equal to 2. In an implementation, the N vehicle accident images can be obtained by an insurance inspector at a vehicle accident scene. Alternatively, in an implementation, the N vehicle accident images are independently obtained and uploaded by the insured. Generally, N vehicle accident images can mean several vehicle accident images, can mean tens of vehicle accident images, or can be hundreds of vehicle accident images in some complex vehicle accidents. The N vehicle accident images can be respectively represented as $I_1, I_2, \ldots,$ and $I_N$.

Then, in step S82, the N feature vectors respectively corresponding to the vehicle accident images are obtained by inputting the vehicle accident images to the convolutional neural network obtained by using the training method. In other words, N corresponding feature vectors $M_1(I_1)$, $M_2(I_2), \ldots,$ and $M_N(I_N)$ are obtained by inputting $I_1$, $I_2, \ldots,$ and $I_N$ to trained convolutional neural network M.

Further, in step S83, the distance between any two of the feature vectors is calculated. In other words, distance $D_k(M_i(I_i), M_j(I_j))$ between any two of the N feature vectors $M_1(I_1)$, $M_2(I_2), \ldots,$ and $M_N(I_N)$ can be calculated, where i≠j. Apparently, $N(N-1)/2$ distances $\{D_1, D_2, \ldots, D_{N(N-1)/2}\}$ can be calculated in total, that is, a value of k ranges from 1 to $N(N-1)/2$.

In step S84, it is determined that the two vehicle accident images corresponding to the distance are abnormal when the distance is greater than the first predetermined threshold. In an implementation, first predetermined threshold T can be determined based on the positive sample pairs and the negative sample pairs used to train convolutional neural network M, so that there is a maximum probability that $D(M(I), M(I^+)) < T$ and $D(M(I), M(I^-)) > T$ for all positive sample pairs and negative sample pairs. For example, in an ideal condition, $D(M(I), M(I^+))$ is less than $D(M(I), M(I^-))$, and in this case, T can be any value from $D(M(I), M(I^+))$ to $D(M(I), M(I^-))$. However, generally, not distances for all positive sample pairs are less than distances for all negative sample pairs. For example, there can be an image for a different vehicle accident scene that fails to be manually screened out in a positive sample pair; or although two images in a positive sample pair come from the same vehicle accident scene, a distance between feature vectors respectively corresponding to the two images is relatively large because of photographing angles of the two images. However, there is a relatively high probability that a distance for a positive sample pair is less than a distance for each negative sample pair, and there is a relatively high probability that a distance for a negative sample pair is greater than a distance for each positive sample pair. For example, distances for 95% of positive sample pairs fall within an interval less than α (α is a positive number), and distances for 95% of negative sample pairs fall within an interval greater than b, where α<b. In this case, T can be a value between α and b, so that there is the maximum probability that $D(M(I), M(I^+)) < T$ and $D(M(I), M(I^-)) > T$ for all the positive sample pairs and all the negative sample pairs. Therefore, there is relatively high accuracy of determining whether the vehicle accident images are abnormal and a relatively high recall rate by selecting first predetermined threshold T according to the previous description. In an implementation, a PR curve or an ROC curve can be drawn for all the positive sample pairs and all the negative sample pairs, and threshold T that enables the highest accuracy and recall rate is obtained from the curve.

When distance $D_k(M_i(I_i), M_j(I_j))$ is greater than threshold T, there is a relatively high probability that sample pair $(I_i, I_j)$ is a negative sample pair. In other words, $I_i$ and $I_j$ can be images corresponding to different vehicle accident scenes, that is, either $I_i$ or $I_j$ is abnormal, and either or both of the two images can be a suspicious image mixed in the vehicle accident images.

In an implementation, the number of $D_k$ greater than threshold T in $\{D_1, D_2, \ldots, D_{N(N-1)/2}\}$ is accumulated to obtain a first probability P1=B/N. The first probability P1 can indicate a probability that a group of vehicle accident images are suspicious. Larger P1 indicates a higher probability of suspicion. In this case, it can be considered that the group of vehicle accident images are generally abnormal. A second predetermined threshold can be set, and it is determined that the N vehicle accident images are generally abnormal when the first probability P1 is greater than the second predetermined threshold. For example, the second predetermined threshold is set to 1, and when P1>1, it can be determined that the group of vehicle accident images are generally abnormal. Therefore, the insured needs to re-provide a group of vehicle accident images, or the group of vehicle accident images need to be manually examined, or images determined as suspicious images in the group of images need to be manually examined.

In an implementation, after it is determined that the two vehicle accident images corresponding to the distance are abnormal, the number M of abnormal vehicle accident images in the N vehicle accident images is accumulated, and a second probability P2=M/N is calculated. The second probability P2 can indicate a probability that a group of vehicle accident images are suspicious. Larger P2 indicates a higher probability of suspicion, and it can be considered that the group of vehicle accident images are generally abnormal. A third predetermined threshold can be set, and it is determined that the N vehicle accident images are generally abnormal when the second probability P2 is greater than the third predetermined threshold. For example, the third predetermined threshold is set to 0.1, and when P2>0.1, it can be determined that the group of vehicle accident images are generally abnormal. Therefore, the insured needs to re-provide a group of vehicle accident images, or the group of vehicle accident images need to be manually examined, or images determined as suspicious images in the group of images need to be manually examined.

Figure 9:
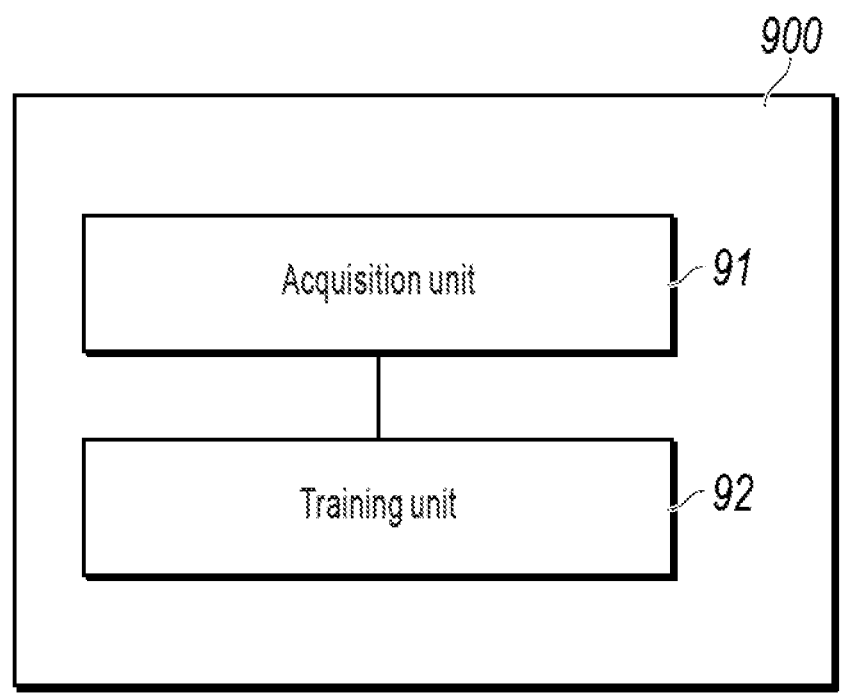
FIG. 9 illustrates an apparatus for training a convolutional neural network, according to an implementation of the present specification.

FIG. 9 illustrates an apparatus 900 for training a convolutional neural network for processing a vehicle accident image, according to an implementation of the present specification. The apparatus 900 includes the following: an acquisition unit 91, configured to obtain at least one positive sample pair, where each positive sample pair includes a first image and a second image, and the first image and the second image correspond to the same vehicle accident scene; and a training unit 92, configured to train the convolutional neural network by using the at least one positive sample pair, to decrease the sum of at least one first distance respectively corresponding to the positive sample pair, where the first distance is a distance between a feature vector of the first image that is obtained by using the convolutional neural network and a feature vector of the second image that is obtained by using the convolutional neural network.

An implementation of the present specification further includes an apparatus for training a convolutional neural network for processing a vehicle accident image, including the following: an acquisition unit, configured to obtain at least one negative sample pair, where each negative sample pair includes a third image and a fourth image, and the third image and the fourth image correspond to different vehicle accident scenes; and a training unit, configured to train the convolutional neural network by using the at least one negative sample pair, to increase the sum of at least one second distance respectively corresponding to the negative sample pair, where the second distance is a distance between a feature vector of the third image that is obtained by using the convolutional neural network and a feature vector of the fourth image that is obtained by using the convolutional neural network.

An implementation of the present specification further includes an apparatus for training a convolutional neural network for processing a vehicle accident image, including the following: an acquisition unit, configured to obtain at least one positive sample pair and at least one negative sample pair, where each positive sample pair includes a first image and a second image, the first image and the second image correspond to the same vehicle accident scene, each negative sample pair includes a third image and a fourth image, and the third image and the fourth image correspond to different vehicle accident scenes; and a training unit, configured to train the convolutional neural network by using the at least one positive sample pair and the at least one negative sample pair, to decrease a value obtained by subtracting the sum of at least one second distance corresponding to the negative sample pair from the sum of at least one first distance corresponding to the positive sample pair, where the first distance is a distance between a feature vector of the first image that is obtained by using the convolutional neural network and a feature vector of the second image that is obtained by using the convolutional neural network, and the second distance is a distance between a feature vector of the third image that is obtained by using the convolutional neural network and a feature vector of the fourth image that is obtained by using the convolutional neural network.

Figure 10:
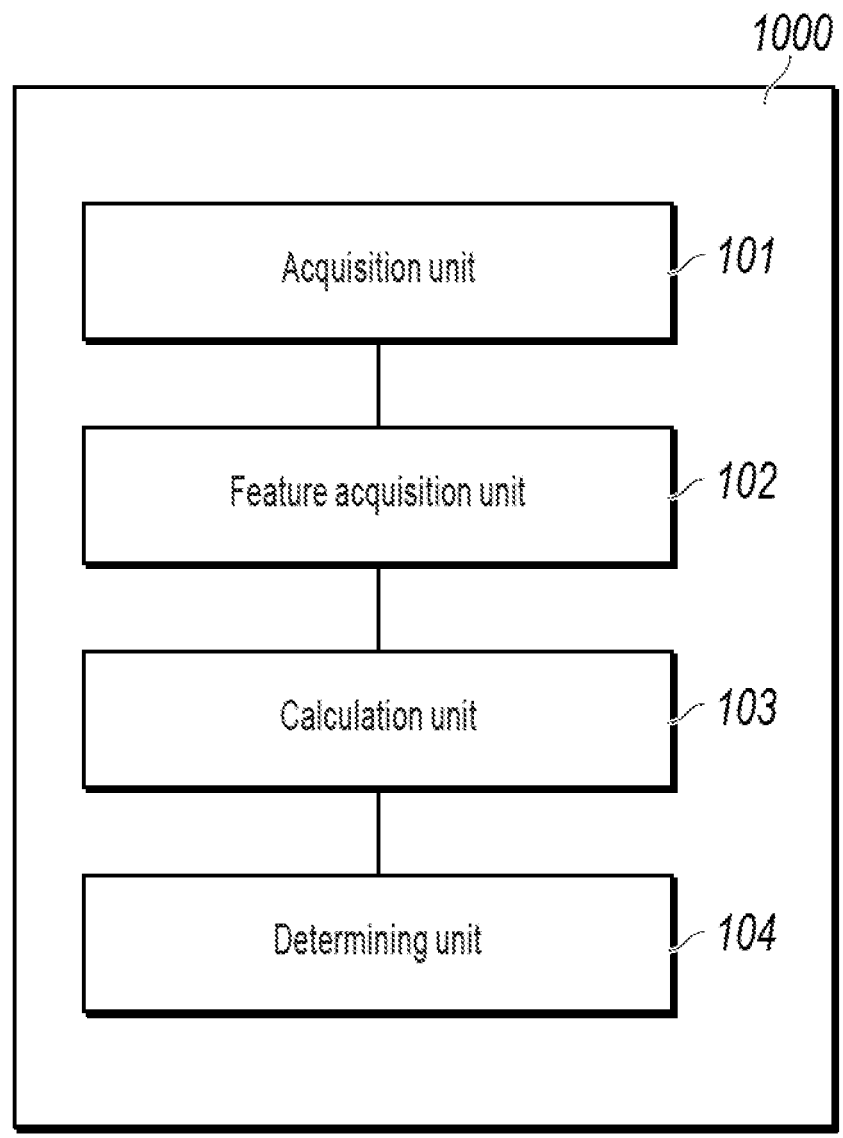
FIG. 10 illustrates a vehicle accident image processing apparatus, according to an implementation of the present specification.

FIG. 10 illustrates a vehicle accident image processing apparatus 1000, according to an implementation of the present specification. The apparatus includes the following: an acquisition unit 101, configured to obtain N vehicle accident images, where N is a natural number greater than or equal to 2; a feature acquisition unit 102, configured to obtain N feature vectors respectively corresponding to the vehicle accident images by inputting the vehicle accident images to a convolutional neural network obtained by using the previous training method; a calculation unit 103, configured to calculate a distance between any two of the feature vectors; and a determining unit 104, configured to determine that two vehicle accident images corresponding to the distance are abnormal when the distance is greater than a first predetermined threshold.

In an implementation, the vehicle accident image processing apparatus further includes the following: a second determining unit, configured to determine the number B of distances greater than the first predetermined threshold after it is determined that the two vehicle accident images corresponding to the distance are abnormal; a second calculation unit, configured to calculate a first probability P1=B/N; and a third determining unit, configured to determine that the N vehicle accident images are generally abnormal when the first probability is greater than a second predetermined threshold.

In an implementation, the vehicle accident image processing apparatus further includes the following: a fourth determining unit, configured to determine the number M of abnormal vehicle accident images in the N vehicle accident images after it is determined that the two vehicle accident images corresponding to the distance are abnormal; a third calculation unit, configured to calculate a second probability P2=M/N; and a fifth determining unit, configured to determine that the N vehicle accident images are generally abnormal when the second probability is greater than a third predetermined threshold.

An implementation of the present specification provides a computer readable storage medium. The computer readable storage medium stores instruction code, and when the instruction code is executed in a computer, the computer performs the method for training a convolutional neural network and/or the vehicle accident image processing method.

An implementation of the present specification provides a computing device including a memory and a processor. The memory stores executable code, and when executing the executable code, the processor implements the method for training a convolutional neural network and/or the vehicle accident image processing method.

Based on the method and apparatus for training a convolutional neural network, and the vehicle accident image processing method and apparatus according to the implementations of the present specification, vehicle accident images can be fast processed with relatively high accuracy and a relatively high recall rate. As such, the vehicle accident images are fast and automatically processed, the insurance processing speed is accelerated, and manual processing used for determining a vehicle accident image is also saved.

A person of ordinary skill in the art can be further aware that, in combination with the examples described in the implementations disclosed in the present specification, units, and algorithm steps can be implemented by electronic hardware, computer software, or a combination thereof. To clearly describe interchangeability between the hardware and the software, compositions and steps of each example are described above based on functions. Whether the functions are performed by hardware or software depends on particular applications and design constraint conditions of the technical solutions. A person of ordinary skill in the art can use different methods to implement the described functions for each particular application, but it should not be considered that the implementation goes beyond the scope of the present application.

Steps of methods or algorithms described in the implementations disclosed in the present specification can be implemented by hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the existing technology.

In the described specific implementations, the objective, technical solutions, and benefits of the present invention are further described in detail. It should be understood that the descriptions are merely specific implementations of the present invention but are not intended to limit the protection scope of the present invention. Any modification, equivalent replacement, or improvement made without departing from the spirit and principle of the present invention should fall within the protection scope of the present invention.

Figure 11:
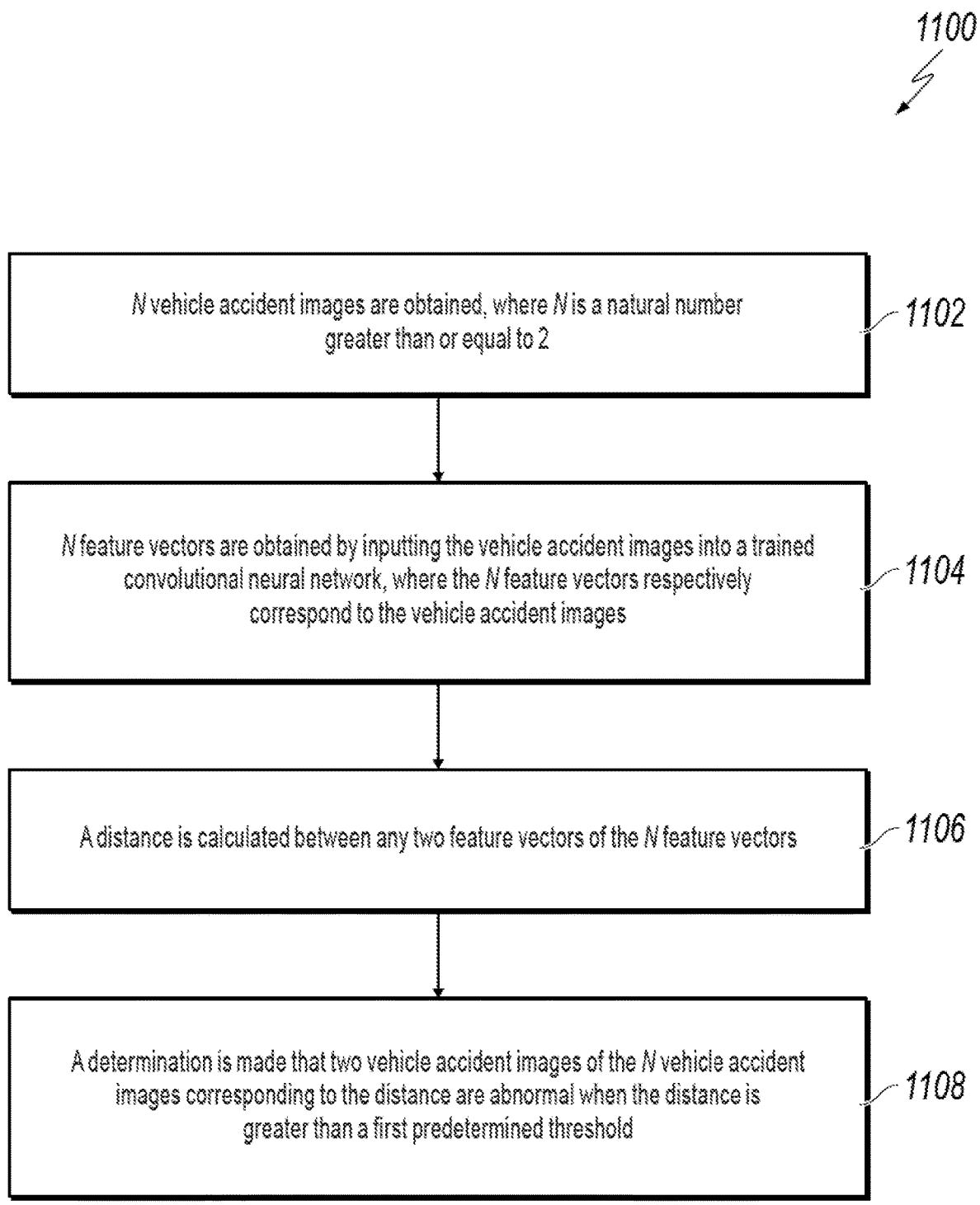
FIG. 11 is a flowchart illustrating an example of a computer-implemented method for processing vehicle accident images, according to an implementation of the present disclosure.

FIG. 11 is a flowchart illustrating an example of a computer-implemented method 1100 for processing vehicle accident images, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order.

At 1102, N vehicle accident images are obtained, where N is a natural number greater than or equal to 2. From 1102, method 1100 proceeds to 1104.

At 1104, N feature vectors are obtained by inputting the vehicle accident images into a trained convolutional neural network, where the N feature vectors respectively correspond to the vehicle accident images. From 1104, method 1100 proceeds to 1106.

At 1106, a distance is calculated between any two feature vectors of the N feature vectors. In some implementations, the distance is a Euclidean distance. From 1106, method 1100 proceeds to 1108.

At 1108, a determination is made that two vehicle accident images of the N vehicle accident images corresponding to the distance are abnormal when the distance is greater than a first predetermined threshold. After 1108, method 1100 can stop.

In some implementations, method 1100 further comprises: 1) determining a number B of distances greater than the first predetermined threshold after determining that the two vehicle accident images corresponding to the distance are abnormal; 2) calculating a first probability based on B and N; and 3) determining that the N vehicle accident images are generally abnormal when the first probability is greater than a second predetermined threshold.

In some implementations, method 1100 further comprises: 1) determining a number M of abnormal vehicle accident images in the N vehicle accident images after determining that the two vehicle accident images corresponding to the distance are abnormal; 2) calculating a second probability P2 based on M and N; and 3) determining that the N vehicle accident images are generally abnormal when the second probability is greater than a third predetermined threshold.

In some implementations, the trained convolutional neural network is trained using at least one positive sample pair, where the training comprises: 1) obtaining at least one positive sample pair, wherein each positive sample pair comprises a first image and a second image, and the first image and the second image correspond to the same vehicle accident scene and 2) training the convolutional neural network by using the at least one positive sample pair, to decrease the sum of at least one first distance respectively corresponding to the positive sample pair, wherein the first distance is a distance between a feature vector of the first image that is obtained by using the convolutional neural network and a feature vector of the second image that is obtained by using the convolutional neural network.

In some implementations, the trained convolutional neural network is trained by at least one negative sample pair, where the training comprises: 1) obtaining at least one negative sample pair, wherein each negative sample pair comprises a third image and a fourth image, and the third image and the fourth image correspond to different vehicle accident scenes and 2) training the convolutional neural network by using the at least one negative sample pair, to increase the sum of at least one second distance respectively corresponding to the negative sample pair, wherein the second distance is a distance between a feature vector of the third image that is obtained by using the convolutional neural network and a feature vector of the fourth image that is obtained by using the convolutional neural network.

In some implementations, the trained convolutional neural network is trained by at least one positive sample pair and at least one negative sample pair, where the training comprises: 1) obtaining at least one positive sample pair and at least one negative sample pair, wherein each positive sample pair comprises a first image and a second image, the first image and the second image correspond to the same vehicle accident scene, each negative sample pair comprises a third image and a fourth image, and the third image and the fourth image correspond to different vehicle accident scenes and 2) training the convolutional neural network by using the at least one positive sample pair and the at least one negative sample pair, to decrease a value obtained by subtracting the sum of at least one second distance corresponding to the negative sample pair from the sum of at least one first distance corresponding to the positive sample pair, wherein the first distance is a distance between a feature vector of the first image that is obtained by using the convolutional neural network and a feature vector of the second image that is obtained by using the convolutional neural network, and the second distance is a distance between a feature vector of the third image that is obtained by using the convolutional neural network and a feature vector of the fourth image that is obtained by using the convolutional neural network.

The described subject matter provides one or more technical features/technical effects over existing technology. For example, the describe methodology provides functionality to determine quickly and with a high-degree of accuracy whether an object represented in a disparate group of images (for example, of an accident vehicle) is the same object, regardless of the setting when the images were recorded. This is important because not all photographic equipment records necessary metadata (such as the time, device, and location associated with a photograph) to distinguish objects represented in images or metadata is easy to modify, rendering the metadata useless. The described methodology and use of a convolutional neural network can be used to ensure data quality, legitimacy, and accuracy (that is, particular images are not abnormal) to help reduce instances of fraud based on images.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for vehicle accident image processing, comprising:
    obtaining a group of N vehicle accident images, wherein N is a natural number greater than or equal to 2;
    obtaining N feature vectors respectively corresponding to the vehicle accident images by inputting the vehicle accident images into a trained convolutional neural network;
    calculating respective distances between pairs of feature vectors among the N feature vectors, the pairs of feature vectors corresponding respectively to pairs of images among the N vehicle accident images;
    determining that a pair of images of the N vehicle accident images corresponding to the distance are abnormal when the distance is greater than a first predetermined threshold;
    determining a number of the vehicle accident images that are abnormal, wherein the number of the vehicle accident images that are abnormal is equal to M;
    calculating a first probability based on M and N;
    determining that the first probability is greater than a second predetermined threshold; and
    in response, classifying the group of the N vehicle accident images as abnormal.

2. The computer-implemented method of claim 1, wherein the trained convolutional neural network is trained using at least one positive sample pair, wherein the training comprises:
    obtaining at least one positive sample pair, wherein each positive sample pair comprises a first image and a second image, and the first image and the second image correspond to the same vehicle accident scene; and
    training the convolutional neural network by using the at least one positive sample pair, to decrease a sum of at least one first distance respectively corresponding to the positive sample pair, wherein the at least one first distance is a distance between a feature vector of the first image that is obtained by using the convolutional neural network and a feature vector of the second image that is obtained by using the convolutional neural network.

3. The computer-implemented method of claim 1, wherein the trained convolutional neural network is trained by at least one negative sample pair, wherein the training comprises:

obtaining at least one negative sample pair, wherein each negative sample pair comprises a third image and a fourth image, and the third image and the fourth image correspond to different vehicle accident scenes; and training the convolutional neural network by using the at least one negative sample pair, to increase a sum of at least one second distance respectively corresponding to the negative sample pair, wherein the at least one second distance is a distance between a feature vector of the third image that is obtained by using the convolutional neural network and a feature vector of the fourth image that is obtained by using the convolutional neural network.

4. The computer-implemented method of claim 1, wherein the trained convolutional neural network is trained by at least one positive sample pair and at least one negative sample pair, wherein the training comprises:

obtaining at least one positive sample pair and at least one negative sample pair, wherein each positive sample pair comprises a first image and a second image, the first image and the second image correspond to the same vehicle accident scene, each negative sample pair comprises a third image and a fourth image, and the third image and the fourth image correspond to different vehicle accident scenes; and training the convolutional neural network by using the at least one positive sample pair and the at least one negative sample pair, to decrease a value obtained by subtracting a sum of at least one second distance corresponding to the negative sample pair from a sum of at least one first distance corresponding to the positive sample pair, wherein the at least one first distance is a distance between a feature vector of the first image that is obtained by using the convolutional neural network and a feature vector of the second image that is obtained by using the convolutional neural network, and the at least one second distance is a distance between a feature vector of the third image that is obtained by using the convolutional neural network and a feature vector of the fourth image that is obtained by using the convolutional neural network.

5. The computer-implemented method of claim 1, wherein the distance is a Euclidean distance.

6. A non-transitory, computer-readable medium storing one or more instructions executable by a computer system to perform operations comprising:

obtaining a group of N vehicle accident images, wherein N is a natural number greater than or equal to 2;

obtaining N feature vectors respectively corresponding to the vehicle accident images by inputting the vehicle accident images into a trained convolutional neural network;

calculating respective distances between pairs of feature vectors among the N feature vectors, the pairs of feature vectors corresponding respectively to pairs of images among the N vehicle accident images;

determining that a pair of images of the N vehicle accident images corresponding to the distance are abnormal when the distance is greater than a first predetermined threshold;

determining a number of the vehicle accident images that are abnormal, wherein the number of the vehicle accident images that are abnormal is equal to M;

calculating a first probability based on M and N;

determining that the first probability is greater than a second predetermined threshold; and in response, classifying the group of the N vehicle accident images as abnormal.

7. The non-transitory, computer-readable medium of claim 6, wherein the trained convolutional neural network is trained using at least one positive sample pair, wherein the training comprises:

obtaining at least one positive sample pair, wherein each positive sample pair comprises a first image and a second image, and the first image and the second image correspond to the same vehicle accident scene; and training the convolutional neural network by using the at least one positive sample pair, to decrease a sum of at least one first distance respectively corresponding to the positive sample pair, wherein the at least one first distance is a distance between a feature vector of the first image that is obtained by using the convolutional neural network and a feature vector of the second image that is obtained by using the convolutional neural network.

8. The non-transitory, computer-readable medium of claim 6, wherein the trained convolutional neural network is trained by at least one negative sample pair, wherein the training comprises:

obtaining at least one negative sample pair, wherein each negative sample pair comprises a third image and a fourth image, and the third image and the fourth image correspond to different vehicle accident scenes; and training the convolutional neural network by using the at least one negative sample pair, to increase a sum of at least one second distance respectively corresponding to the negative sample pair, wherein the at least one second distance is a distance between a feature vector of the third image that is obtained by using the convolutional neural network and a feature vector of the fourth image that is obtained by using the convolutional neural network.

9. The non-transitory, computer-readable medium of claim 6, wherein the trained convolutional neural network is trained by at least one positive sample pair and at least one negative sample pair, wherein the training comprises:

obtaining at least one positive sample pair and at least one negative sample pair, wherein each positive sample pair comprises a first image and a second image, the first image and the second image correspond to the same vehicle accident scene, each negative sample pair comprises a third image and a fourth image, and the third image and the fourth image correspond to different vehicle accident scenes; and training the convolutional neural network by using the at least one positive sample pair and the at least one negative sample pair, to decrease a value obtained by subtracting a sum of at least one second distance corresponding to the negative sample pair from a sum of at least one first distance corresponding to the positive sample pair, wherein the at least one first distance is a distance between a feature vector of the first image that is obtained by using the convolutional neural network and a feature vector of the second image that is obtained by using the convolutional neural network, and the at least one second distance is a distance between a feature vector of the third image that is obtained by using the convolutional neural network and a feature vector of the fourth image that is obtained by using the convolutional neural network.

10. The non-transitory, computer-readable medium of claim 6, wherein the distance is a Euclidean distance.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  obtaining a group of N vehicle accident images, wherein N is a natural number greater than or equal to 2;
  obtaining N feature vectors respectively corresponding to the vehicle accident images by inputting the vehicle accident images into a trained convolutional neural network;
  calculating respective distances between pairs of feature vectors among the N feature vectors, the pairs of feature vectors corresponding respectively to pairs of images among the N vehicle accident images;
  determining that a pair of images of the N vehicle accident images corresponding to the distance are abnormal when the distance is greater than a first predetermined threshold;
  determining a number of the vehicle accident images that are abnormal, wherein the number of the vehicle accident images that are abnormal is equal to M;
  calculating a first probability based on M and N;
  determining that the first probability is greater than a second predetermined threshold; and
  in response, classifying the group of the N vehicle accident images as abnormal.

12. The computer-implemented system of claim 11, wherein the trained convolutional neural network is trained using at least one positive sample pair, wherein the training comprises:
  obtaining at least one positive sample pair, wherein each positive sample pair comprises a first image and a second image, and the first image and the second image correspond to the same vehicle accident scene; and
  training the convolutional neural network by using the at least one positive sample pair, to decrease a sum of at least one first distance respectively corresponding to the positive sample pair, wherein the at least one first distance is a distance between a feature vector of the first image that is obtained by using the convolutional neural network and a feature vector of the second image that is obtained by using the convolutional neural network.

13. The computer-implemented system of claim 11, wherein the trained convolutional neural network is trained by at least one negative sample pair, wherein the training comprises:
  obtaining at least one negative sample pair, wherein each negative sample pair comprises a third image and a fourth image, and the third image and the fourth image correspond to different vehicle accident scenes; and
  training the convolutional neural network by using the at least one negative sample pair, to increase a sum of at least one second distance respectively corresponding to the negative sample pair, wherein the at least one second distance is a distance between a feature vector of the third image that is obtained by using the convolutional neural network and a feature vector of the fourth image that is obtained by using the convolutional neural network.

14. The computer-implemented system of claim 11, wherein the trained convolutional neural network is trained by at least one positive sample pair and at least one negative sample pair, wherein the training comprises:
  obtaining at least one positive sample pair and at least one negative sample pair, wherein each positive sample pair comprises a first image and a second image, the first image and the second image correspond to the same vehicle accident scene, each negative sample pair comprises a third image and a fourth image, and the third image and the fourth image correspond to different vehicle accident scenes; and
  training the convolutional neural network by using the at least one positive sample pair and the at least one negative sample pair, to decrease a value obtained by subtracting a sum of at least one second distance corresponding to the negative sample pair from a sum of at least one first distance corresponding to the positive sample pair, wherein the at least one first distance is a distance between a feature vector of the first image that is obtained by using the convolutional neural network and a feature vector of the second image that is obtained by using the convolutional neural network, and the at least one second distance is a distance between a feature vector of the third image that is obtained by using the convolutional neural network and a feature vector of the fourth image that is obtained by using the convolutional neural network.

15. The computer-implemented system of claim 11, wherein the distance is a Euclidean distance.

* * * * *